(12) United States Patent
Magallanes et al.

(10) Patent No.: US 9,296,439 B2
(45) Date of Patent: Mar. 29, 2016

(54) HELMET HOLDER ASSEMBLY

(71) Applicants: Victor B. Magallanes, Redwood City, CA (US); Victor A. Magallanes, Redwood City, CA (US)

(72) Inventors: Victor B. Magallanes, Redwood City, CA (US); Victor A. Magallanes, Redwood City, CA (US)

( * ) Notice: Subject to any disclaimer, the term of this patent is extended or adjusted under 35 U.S.C. 154(b) by 3 days.

(21) Appl. No.: 14/252,228

(22) Filed: Apr. 14, 2014

(65) Prior Publication Data

US 2015/0291238 A1  Oct. 15, 2015

(51) Int. Cl.
*B62J 1/28* (2006.01)
*A42B 3/00* (2006.01)
*B62J 11/00* (2006.01)

(52) U.S. Cl.
CPC . *B62J 1/28* (2013.01); *A42B 3/006* (2013.01); *B62J 11/005* (2013.01)

(58) Field of Classification Search
CPC ............ B62J 11/005; B62J 1/28; A42B 3/006
USPC ........................................................ 224/413
See application file for complete search history.

(56) References Cited

U.S. PATENT DOCUMENTS

| | | | | |
|---|---|---|---|---|
| 3,604,671 A | * | 9/1971 | Walker | ........................ 248/309.1 |
| 3,837,545 A | * | 9/1974 | Rogers, Jr. | ...................... 224/446 |
| 4,024,738 A | * | 5/1977 | Pi | ....................................... 70/59 |
| 4,063,637 A | * | 12/1977 | Danforth | ........................... 206/8 |
| 4,201,398 A | | 5/1980 | Meier | |
| D283,786 S | | 5/1986 | Chap | |
| 4,733,805 A | | 3/1988 | Sawada | |
| D354,841 S | | 1/1995 | Bussell | |
| 5,884,825 A | | 3/1999 | Schroeder | |
| D507,737 S | | 7/2005 | Flanagan | |
| 2003/0173386 A1 | | 9/2003 | Scaccia | |

\* cited by examiner

*Primary Examiner* — Corey Skurdal

(57) ABSTRACT

A helmet holder assembly releasably supports a helmet on a rear end of a vehicle, such as a motorcycle. The assembly includes a mount having a first surface, a second surface and a perimeter surface coupled to and extending between the first surface and the second surface. The second surface of the mount is configured for mounting to a vehicle. A holding member has a bottom perimeter edge and a peripheral wall coupled to and extending upwardly from the bottom perimeter edge. The holding member has a size and shape such that an outer surface of the holding member is configured to contour to and support an interior of a helmet thereon.

10 Claims, 3 Drawing Sheets

HELMET HOLDER ASSEMBLY

BACKGROUND OF THE DISCLOSURE

Field of the Disclosure

The disclosure relates to holder devices and more particularly pertains to a new holder device for releasably supporting a helmet on a rear end of a vehicle, such as a motorcycle.

SUMMARY OF THE DISCLOSURE

An embodiment of the disclosure meets the needs presented above by generally comprising a mount having a first surface, a second surface and a perimeter surface coupled to and extending between the first surface and the second surface. The second surface of the mount is configured for mounting to a vehicle. A holding member has a bottom perimeter edge and a peripheral wall coupled to and extending upwardly from the bottom perimeter edge. The holding member has a size and shape such that an outer surface of the holding member is configured to contour to and support an interior of a helmet thereon.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
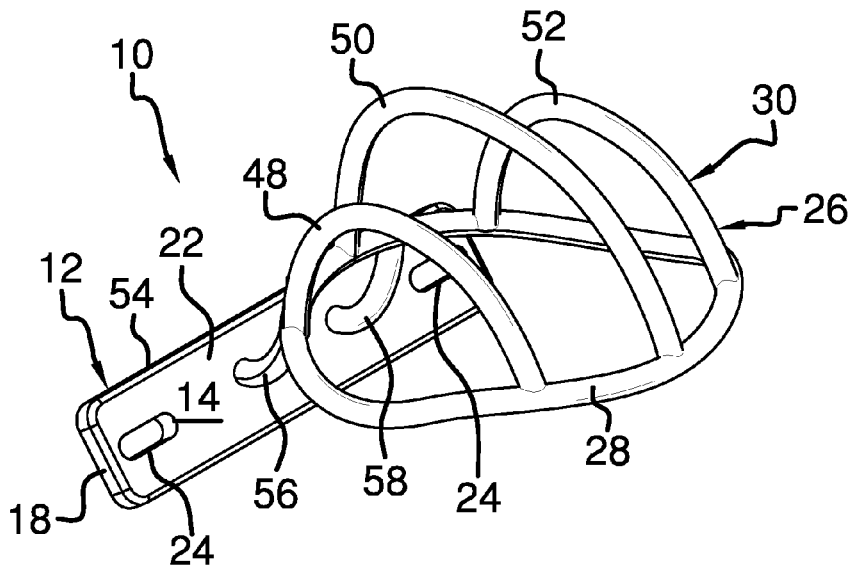
FIG. 1 is a front perspective view of a helmet holder assembly according to an embodiment of the disclosure.
Figure 2:
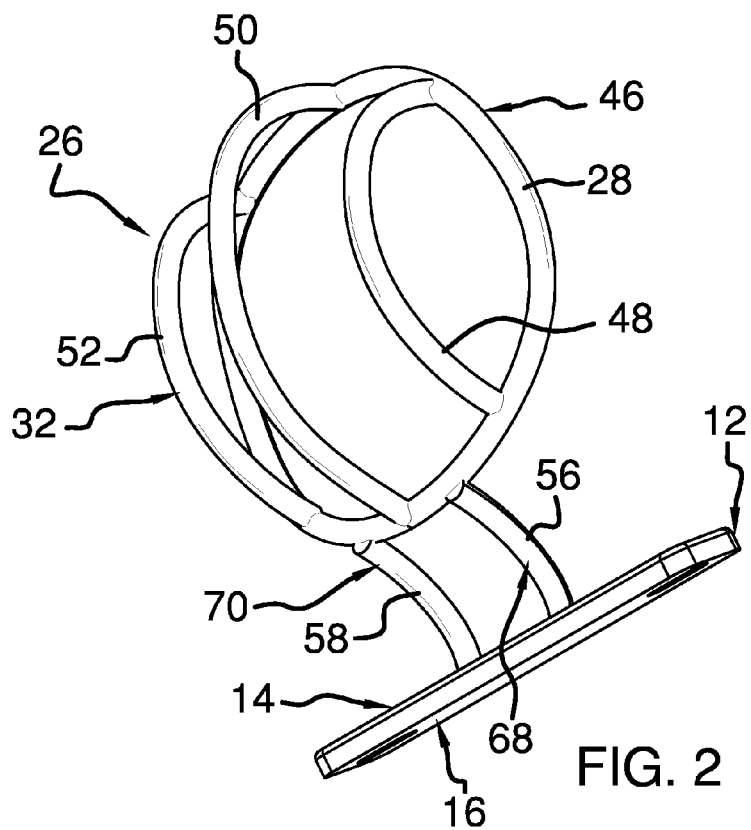
FIG. 2 is a rear perspective view of an embodiment of the disclosure.
Figure 3:
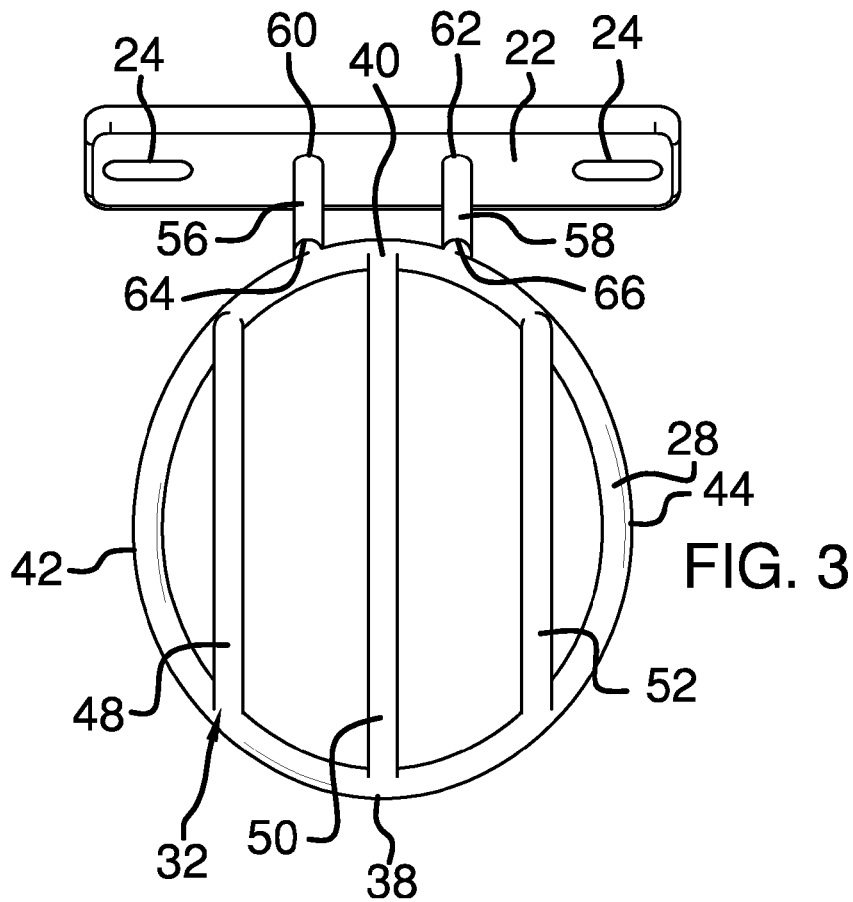
FIG. 3 is a top view of an embodiment of the disclosure.
Figure 4:
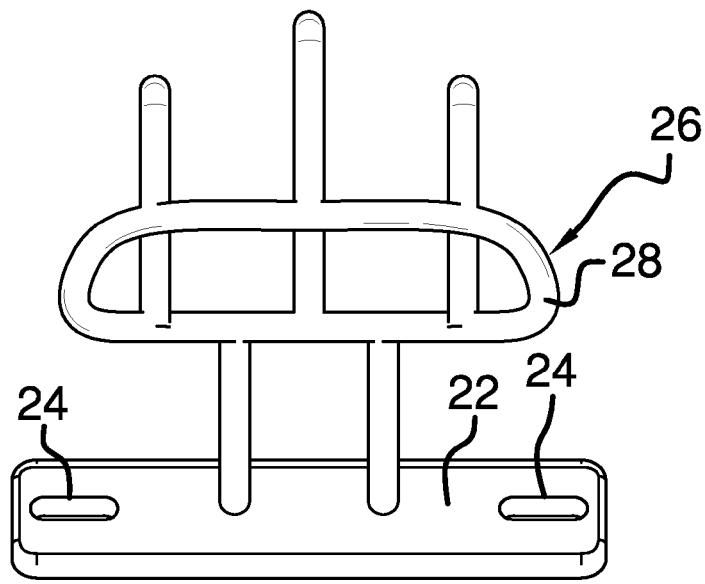
FIG. 4 is a front view of an embodiment of the disclosure.
Figure 5:
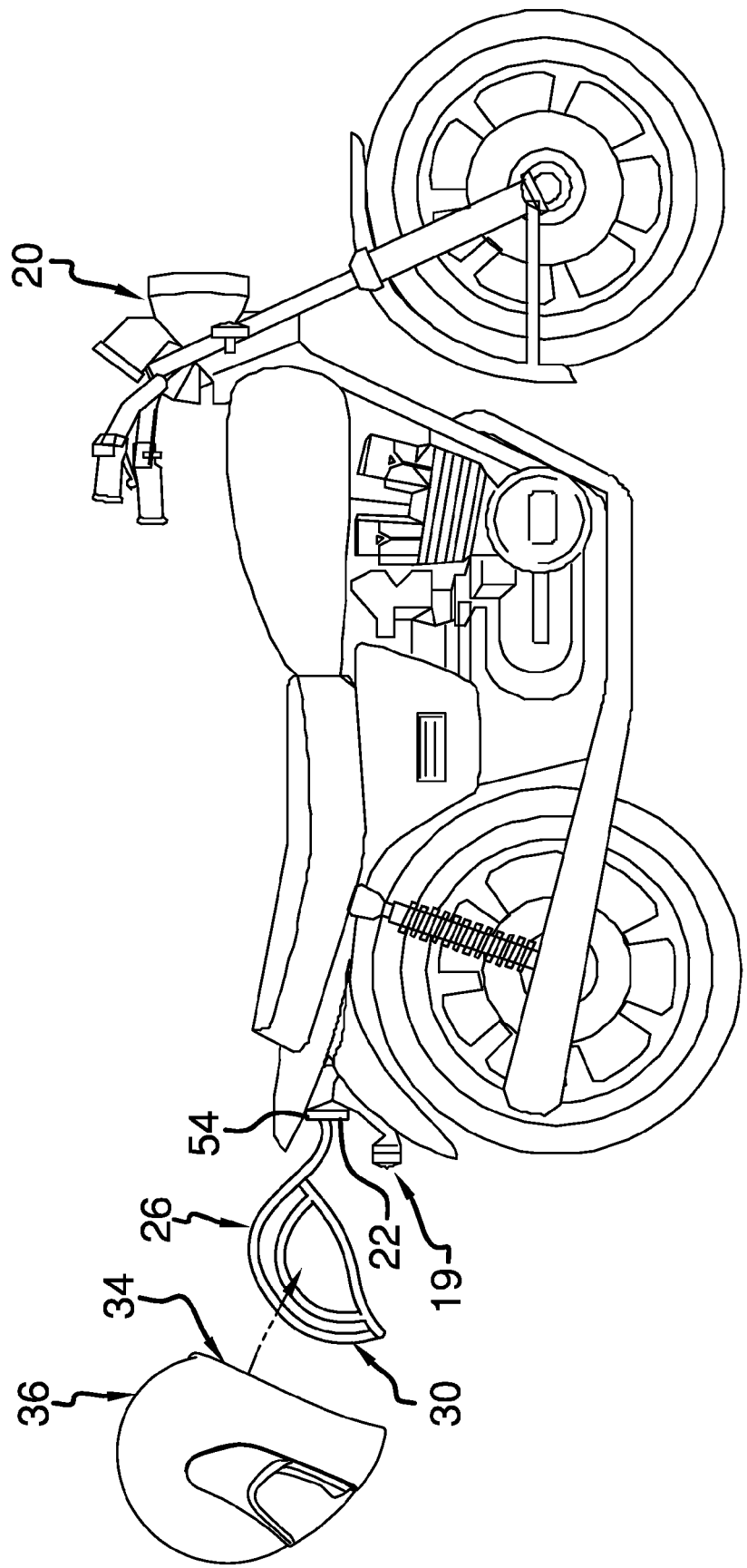
FIG. 5 is a side view of an embodiment of the disclosure in use.

With reference now to the drawings, and in particular to FIGS. 1 through 5 thereof, a new holder device embodying the principles and concepts of an embodiment of the disclosure and generally designated by the reference numeral 10 will be described.

As best illustrated in FIGS. 1 through 5, the helmet holder assembly 10 generally comprises a mount 12 having a first surface 14, a second surface 16 and a perimeter surface 18 coupled to and extending between the first surface 14 and the second surface 16. The second surface 16 of the mount 12 is configured for mounting to a rear end 19 of a vehicle 20, such as a motorcycle. The mount 12 may comprise a plate 22 wherein each of the first 14 and second 16 surfaces of the mount 12 is planar. A plurality of holes 24 may be positioned in and extend through the first surface 14 and the second surface 16 of the mount 12. Each of the holes 24 receives a fastener therethrough for mounting the assembly 10 to the vehicle 20.

A holding member 26 is provided having a bottom perimeter edge 28 and a peripheral wall 30 coupled to and extending upwardly from the bottom perimeter edge 28. The holding member 26 has a size and shape such that an outer surface 32 of the holding member 26 is configured to contour to and support an interior 34 of a helmet 36 thereon. The outer surface 32 of the holding member 26 may be convexly arcuate between a front side 38 and a rear side 40 of the holding member 26 and between a first lateral side 42 and a second lateral side 44 of the holding member 26 such that the holding member 26 is dome-shaped. The holding member 26 may be comprised of a rigid material, such as metal, plastic or other similar material. The peripheral wall 30 of the holding member may comprise a plurality of spaced rods 48, 50, 52. Each of the spaced rods 48, 50, 52 may be parallel with respect to each other. Each of the spaced rods 48, 50, 52 may extend between the front side 38 and the rear side 40 of the holding member 26. The holding member 26 may be angled relative to the mount 12 such that, when mounted on a motorcycle or similar vehicle 20, the front side 38 of the holding member 26 is spaced below the mount 12 and the rear side 40 of the holding member 26 positioned adjacent to the bottom perimeter edge 28 is aligned with a top edge 54 of the perimeter surface 18 of the mount 12.

A pair of arms 56, 58 is coupled to and extends outwardly from the first surface 14 of the mount 12. Each of the arms 56, 58 has a first end 60, 62 and a second end 64, 66. The first ends 60, 62 of each of the arms 56, 58 are coupled to the mount 12. The second ends 64, 66 of each of the arms 56, 58 are coupled to the holding member 26 and more particularly to the bottom perimeter edge 28 of the holding member 26. Each of the arms 56, 58 may be curved between the first end 60, 62 and the associated second end 64, 66. Each of the arms 56, 58 may have an upper surface 68, 70 being concavely arcuate between the first end 60, 62 and the associated second end 64, 66.

In use, as stated above and shown in the Figures, the mount 12 is attached to a rear end 19 of a vehicle 20, such as a motorcycle. The person then rides the vehicle 20 in a conventional manner. However, after riding, the person removes the helmet 36 from their head, and places the interior 34 of the helmet 36 onto the outer surface 32 of the holding member 26 to support the helmet 36 on the vehicle 22. This provides an alternative to carrying the helmet 36 into the person's destination or having to hang the helmet 36 from the handlebars 72 of the vehicle 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A helmet holder assembly comprising:
   a mount having a first surface, a second surface and a perimeter surface coupled to and extending between said first surface and said second surface, said second surface of said mount being configured for mounting to a vehicle;
   a holding member having a bottom perimeter edge and a peripheral wall coupled to and extending upwardly from said bottom perimeter edge, said holding member having a size and shape such that an outer surface of said holding member is configured to contour to and support an interior of a helmet thereon, said peripheral wall of said holding member comprising a plurality of spaced rods, each of said spaced rods extending between a front side and a rear side of said holding member; and
   a pair of arms being coupled to and extending outwardly from said first surface of said mount, each of said arms having a first end and a second end, said first ends of each of said arms being coupled to said mount, said second ends of each of said arms being coupled to said holding member, each of said arms being curved between said first end and said associated second end.

2. The assembly of claim 1, further comprising said outer surface of said holding member being convexly arcuate between a front side and a rear side of said holding member and between a first lateral side and a second lateral side of said holding member.

3. The assembly of claim 1, further including wherein said holding member is comprised of a rigid material.

4. The assembly of claim 1, further comprising each of said arms having an upper surface being concavely arcuate between said first end and said associated second end.

5. The assembly of claim 1, further comprising wherein said holding member is angled relative to said mount such that a front side of said holding member is spaced below said mount and a rear side of said holding member positioned adjacent to said bottom perimeter edge is aligned with a top edge of said perimeter surface of said mount.

6. The assembly of claim 1, further comprising wherein said mount comprises a plate, each of said first and second surfaces of said mount being planar.

7. The assembly of claim 1, further comprising a plurality of holes positioned in and extending through said first surface and said second surface of said mount, each of said holes being configured to receive a fastener therethrough for mounting said assembly to the vehicle.

8. The assembly of claim 1, further comprising each of said spaced rods being parallel with respect to each other.

9. A helmet holder assembly comprising:
   a mount having a first surface, a second surface and a perimeter surface coupled to and extending between said first surface and said second surface, said second surface of said mount being configured for mounting to a vehicle, said mount comprising a plate, each of said first and second surfaces of said mount being planar, a plurality of holes positioned in and extending through said first surface and said second surface of said mount, each of said holes being configured to receive a fastener therethrough for mounting said assembly to the vehicle;
   a holding member having a bottom perimeter edge and a peripheral wall coupled to and extending upwardly from said bottom perimeter edge, said holding member having a size and shape such that an outer surface of said holding member is configured to contour to and support an interior of a helmet thereon, said outer surface of said holding member being convexly arcuate between a front side and a rear side of said holding member and between a first lateral side and a second lateral side of said holding member, said holding member being comprised of a rigid material, said peripheral wall of said holding member comprising a plurality of spaced rods, each of said spaced rods being parallel with respect to each other, each of said spaced rods extending between said front side and said rear side of said holding member, said holding member being angled relative to said mount when said second surface of said mount is mounted to the vehicle such that said front side of said holding member is spaced below said mount and said rear side of said holding member positioned adjacent to said bottom perimeter edge is aligned with a top edge of said perimeter surface of said mount; and
   a pair of arms being coupled to and extending outwardly from said first surface of said mount, each of said arms having a first end and a second end, said first ends of each of said arms being coupled to said mount, said second ends of each of said arms being coupled to said bottom perimeter edge of said holding member, each of said arms being curved between said first end and said associated second end, each of said arms having an upper surface being concavely arcuate between said first end and said associated second end.

10. A helmet holder assembly comprising:
    a vehicle;
    a mount having a first surface, a second surface and a perimeter surface coupled to and extending between said first surface and said second surface, said second surface of said mount being mountable on a rear end of said vehicle; and
    a holding member having a bottom perimeter edge and a peripheral wall coupled to and extending upwardly from said bottom perimeter edge, said holding member having a size and shape such that an outer surface of said holding member is configured to contour to and support an interior of a helmet thereon;
    said mount comprising a plate, each of said first and second surfaces of said mount being planar, a plurality of holes positioned in and extending through said first surface and said second surface of said mount, each of said holes being configured to receive a fastener therethrough for mounting said assembly to said vehicle;
    said outer surface of said holding member being convexly arcuate between a front side and a rear side of said holding member and between a first lateral side and a second lateral side of said holding member, said holding member being comprised of a rigid material, said peripheral wall of said holding member comprising a plurality of spaced rods, each of said spaced rods being parallel with respect to each other, each of said spaced rods extending between said front side and said rear side of said holding member, said holding member being angled relative to said mount when said second surface of said mount is mounted to said vehicle such that said front side of said holding member is spaced below said mount and said rear side of said holding member positioned adjacent to said bottom perimeter edge is aligned with a top edge of said perimeter surface of said mount; and a pair of arms being coupled to and extending outwardly from said first surface of said mount, each of said arms having a first end and a second end, said first ends of each of said arms being coupled to said mount, said second ends of each of said arms being coupled to said bottom perimeter edge of said holding member, each of said arms being curved between said first end and said associated second end, each of said arms having an upper surface being concavely arcuate between said first end and said associated second end.

\* \* \* \* \*